US009972032B1

(12) United States Patent
Koshy et al.

(10) Patent No.: US 9,972,032 B1
(45) Date of Patent: May 15, 2018

(54) METHOD, APPARATUS, AND COMPUTER READABLE MEDIUM FOR PROVIDING A SELF-SERVICE INTERFACE

(71) Applicant: Groupon, Inc., Chicago, IL (US)

(72) Inventors: Tanya Koshy, Sunnyvale, CA (US); Matias Arenas, Mountain View, CA (US); Gaston L'Huillier, Cambridge, MA (US); Francisco Larrain, Palo Alto, CA (US); Lori E. Kaplan, Menlo Park, CA (US); Ricardo Zilleruelo, Mountain View, CA (US); Kavita Kochar, Chicago, IL (US); Amit Koren, Chicago, IL (US); Stephen Wooten, Chicago, IL (US); Karan Kaushik, Mountain View, CA (US); Nathaniel B. Scholl, Oakland, CA (US); Seth Harris, Greenwich, CT (US); Jason A. Crawford, San Francisco, CA (US); Rodrigo Duenas, Chicago, IL (US); Latife Genc-Kaya, Chicago, IL (US); Kamson Lai, Chicago, IL (US); Aviv Eyal, Chicago, IL (US); Deepika Misra, Chicago, IL (US); Natalia Corominas, Chicago, IL (US); Mechie Nkengla, Chicago, IL (US); Mathew Van Orden, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 347 days.

(21) Appl. No.: 14/039,842

(22) Filed: Sep. 27, 2013

Related U.S. Application Data

(63) Continuation-in-part of application No. 13/839,226, filed on Mar. 15, 2013, and a continuation-in-part of
(Continued)

(51) Int. Cl.
*G06Q 30/02* (2012.01)
(52) U.S. Cl.
CPC ............................. *G06Q 30/0276* (2013.01)
(58) Field of Classification Search
CPC .................................................. G06Q 30/0276
(Continued)

(56) References Cited

U.S. PATENT DOCUMENTS 5,715,445 A 2/1998 Wolfe
5,870,770 A 2/1999 Wolfe
(Continued)

FOREIGN PATENT DOCUMENTS

KR 10-2008-0036829 A 4/2008
WO 00/79456 A2 12/2000
(Continued)

OTHER PUBLICATIONS

Office Action for U.S. Appl. No. 13/749,272 dated Feb. 13, 2015.
(Continued)

*Primary Examiner* — Namrata Boveja
*Assistant Examiner* — Azam Ansari
(74) *Attorney, Agent, or Firm* — Alston & Bird LLP

(57) ABSTRACT

Provided herein are systems, methods and computer readable media for programmatically generating and/or revising promotion offers for a merchant based on one or more merchant self-service indicators. In providing such functionality, the system can be configured to, for example, facilitate registration and verification of merchant identities, determine promotion content and parameters based on merchant self-service indicators, and monitor and analyze promotion offers for merchants with similar merchant self-service indicators. The system may determine the relative successfulness of a promotion offer for a merchant and/or category of merchant. In some embodiments, the system may be
(Continued)

further configured to revise the promotion offer programmatically and/or upon receiving the merchant's approval of the programmatically generated proposed edits to the promotion offer.

45 Claims, 11 Drawing Sheets

Related U.S. Application Data application No. 13/839,414, filed on Mar. 15, 2013, and a continuation-in-part of application No. 13/833,548, filed on Mar. 15, 2013, and a continuation-in-part of application No. 13/922,750, filed on Jun. 20, 2013, and a continuation-in-part of application No. 13/913,887, filed on Jun. 10, 2013, and a continuation-in-part of application No. 13/929,253, filed on Jun. 27, 2013, and a continuation-in-part of application No. 13/749,272, filed on Jan. 24, 2013.

(60) Provisional application No. 61/640,647, filed on Apr. 30, 2012, provisional application No. 61/706,664, filed on Sep. 27, 2012, provisional application No. 61/618,338, filed on Mar. 30, 2012.

(58) Field of Classification Search
USPC ...................................................... 705/14.65
See application file for complete search history.

(56) References Cited

U.S. PATENT DOCUMENTS

| | | |
|---|---|---|
| 5,946,682 A | 8/1999 | Wolfe |
| 5,948,040 A | 9/1999 | DeLorme et al. |
| 5,970,470 A | 10/1999 | Walker et al. |
| 6,006,252 A | 12/1999 | Wolfe |
| 6,049,778 A | 4/2000 | Walker et al. |
| 6,101,484 A | 8/2000 | Halbert et al. |
| 6,128,599 A | 10/2000 | Walker et al. |
| 6,151,603 A | 11/2000 | Wolfe |
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,384,850 B1 | 5/2002 | McNally et al. |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van Horn et al. |
| 6,604,103 B1 | 8/2003 | Wolfe |
| 6,631,356 B1 | 10/2003 | Van Horn et al. |
| 6,754,636 B1 | 6/2004 | Walker et al. |
| 6,778,837 B2 | 8/2004 | Bade et al. |
| 6,812,851 B1 | 11/2004 | Dukach et al. |
| 6,836,476 B1 | 12/2004 | Dunn et al. |
| 6,876,983 B1 | 4/2005 | Goddard et al. |
| 6,901,374 B1 | 5/2005 | Himes |
| 6,918,039 B1 | 7/2005 | Hind et al. |
| 6,928,416 B1 | 8/2005 | Bertash |
| 6,931,130 B1 | 8/2005 | Kraft, IV et al. |
| 6,934,690 B1 | 8/2005 | Van Horn et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis, II et al. |
| 7,039,603 B2 | 5/2006 | Walker et al. |
| 7,043,526 B1 | 5/2006 | Wolfe |
| 7,072,848 B2 | 7/2006 | Boyd et al. |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van Horn et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van Horn et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van Horn et al. |
| 7,376,580 B1 | 5/2008 | Walker et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van Horn et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,672,897 B2 | 3/2010 | Chung et al. |
| 7,689,468 B2 | 3/2010 | Walker et al. |
| 7,689,469 B1 | 3/2010 | Mesaros |
| 7,693,736 B1 | 4/2010 | Chu et al. |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,103,519 B2 | 1/2012 | Kramer et al. |
| 8,108,249 B2 | 1/2012 | Schroeder et al. |
| 8,131,619 B1 | 3/2012 | Veselka |
| 8,150,735 B2 | 4/2012 | Walker et al. |
| 8,284,061 B1 | 10/2012 | Dione |
| 8,301,495 B2 | 10/2012 | Mason |
| 8,355,948 B2 | 1/2013 | Mason |
| 8,364,501 B2 | 1/2013 | Anand |

(56) References Cited

U.S. PATENT DOCUMENTS

| | | |
|---|---|---|
| 8,407,252 B2 | 3/2013 | Bennett et al. |
| 8,650,072 B2 | 2/2014 | Mason et al. |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1* | 8/2002 | Szabo ............... G06Q 10/0637 705/14.53 |
| 2002/0123930 A1 | 9/2002 | Boyd et al. |
| 2002/0188511 A1 | 12/2002 | Johnson et al. |
| 2003/0004802 A1 | 1/2003 | Callegari |
| 2003/0018559 A1 | 1/2003 | Chung et al. |
| 2003/0055765 A1 | 3/2003 | Bernhardt |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0075945 A1 | 4/2005 | Hodge et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2009/0006182 A1 | 1/2009 | Gammon |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1 | 2/2009 | Foster |
| 2009/0070263 A1 | 3/2009 | Davis et al. |
| 2009/0094109 A1 | 4/2009 | Davis et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0063870 A1 | 3/2010 | Anderson et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1* | 9/2010 | Prasad ................ G06Q 30/00 705/14.52 |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1 | 2/2011 | Hawkins et al. |
| 2011/0054996 A1 | 3/2011 | Spector |
| 2011/0099082 A1 | 4/2011 | Walker et al. |
| 2011/0153400 A1 | 6/2011 | Averbuch |
| 2011/0173096 A1 | 7/2011 | Bui |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0313840 A1 | 12/2011 | Mason et al. |
| 2011/0313867 A9 | 12/2011 | Silver |
| 2012/0016745 A1 | 1/2012 | Hendrickson |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Sammon |
| 2012/0088487 A1 | 4/2012 | Khan |
| 2012/0095852 A1 | 4/2012 | Lloyd |
| 2012/0150603 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0303434 A1 | 11/2012 | Postrel |
| 2013/0024364 A1 | 1/2013 | Katzin |
| 2013/0085804 A1* | 4/2013 | Leff .................. G06Q 30/0219 705/7.29 |
| 2013/0254104 A1 | 9/2013 | Fernandez |
| 2013/0275242 A1 | 10/2013 | Ramaratnam et al. |
| 2013/0317894 A1* | 11/2013 | Zhu .................... G06Q 30/02 705/14.13 |
| 2014/0046757 A1 | 2/2014 | Kahn et al. |
| 2014/0095232 A1 | 4/2014 | Shiva et al. |
| 2014/0122200 A1 | 5/2014 | Granville |
| 2014/0207584 A1 | 7/2014 | Wicha et al. |
| 2015/0046271 A1 | 2/2015 | Scholl et al. |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |
| WO | 2014/062229 A1 | 4/2014 |
| WO | 2014/062230 A1 | 4/2014 |

OTHER PUBLICATIONS

Office Action for U.S. Appl. No. 13/833,548 dated Jul. 31, 2015.
Office Action for U.S. Appl. No. 13/839,226 dated Jun. 25, 2015.

(56) References Cited

OTHER PUBLICATIONS

U.S. Appl. No. 61/618,338, filed Mar. 30, 2012, In re: Kim entitled *Generating Deal Offers and Providing Analytics Data*.
U.S. Appl. No. 61/661,291, filed Jun. 18, 2012, In re: Kim et al. entitled *Facilitating Consumer Payments and Redemptions of Deal Offers*.
U.S. Appl. No. 61/682,762, filed Aug. 13, 2012, In re: Shariff et al. entitled *Unified payment and Return on Investment System*.
Office Action for U.S. Appl. No. 13/839,226 dated Nov. 21, 2014.
Office Action for U.S. Appl. No. 13/833,548 dated Feb. 10, 2016.
Office Action for U.S. Appl. No. 13/839,226 dated Mar. 16, 2016.
Office Action for U.S. Appl. No. 13/749,272 dated Oct. 26, 2015.
Office Action for U.S. Appl. No. 13/839,226 dated Sep. 30, 2016.
Office Action for U.S. Appl. No. 13/749,272 dated Nov. 3, 2016.
Office Action for U.S. Appl. No. 13/833,548 dated Jan. 11, 2017.
U.S. Provisional Patent Application filed Feb. 27, 2013, U.S. Appl. No. 61/770,174.
U.S. Provisional Application filed May 17, 2013; In re: Kahn et al., entitled Unified Payment and Return on Investment System, U.S. Appl. No. 61/824,850.
U.S. Patent Application filed Sep. 28, 2012, In re: Shiva entitled "Scheduling Appointments With Deal Offers", U.S. Appl. No. 13/631,313.
U.S. Patent Application filed Mar. 15, 2013, U.S. Appl. No. 13/832,804.
Staff, "ActBig.com muscles in on group buying power", RedHerring.com, Oct. 13, 1999.
Rueb, Emily S., "Group Buying, Better Together", The New York Times City Blog, Feb. 16, 2010, 3 pgs.
PCT Written Openion of the International Searching Authority for Application PCT/US2013/033169 dated Jun. 10, 2013.
PCT international Search Report for Application PCT/US2013/033169 dated Jun. 10, 2013.
PCT international Search Report and Written Openion of the International Searching Authority for Application PCT/US2013/062389 dated May 27, 2014.
PCT international Search Report and Written Openion of the International Searching Authority for Application PCT/US2013/033145 dated Jun. 21, 2013.
PCT international Preliminary Report on Patentability for Application PCT/US2013/062389 dated Mar. 31, 2015.
PCT international Preliminary Report on Patentability for Application PCT/US2013/033169 dated Apr. 21, 2015.
PCT international Preliminary Report on Patentability for Application PCT/US2013/033145 dated Apr. 21, 2015.
Krishnan S. Anand and Ravi Aron (Opim Department, the Wharton School, University of Pennsylvania), Group Buying on the Web: A Comparison of Price Discovery Mechanisms, Management Science, vol. 49, No. 11, pp. 1546-1562, Nov. 2003.
Kauffman, Robert J. et al., "Bid Together, Buy Together: On The Efficacy of Group-Buying Business Models in Internet Based Selling", paper prepared for the 5th Annual University of Minnesota Electronic Commerce conference, Mar. 27-28,2001, Carlson School of Management, University of Minnesota, MN, 44 pgs.
International Search Report and Written Opinion for Application No. PCT/US201.2/027616 dated Sep. 27,2012.
Editor, "Technology Drives ActBig 'Next Generation' GroupBuying Application", Market Wire, Feb. 29,2005.
Bermant, Charles, "ActBig: Save BiG", Internetnews.com, Nov. 16, 1999, 3 pgs.
Alan S. Davis "Group Buying on the Internet", Seminar Presentation Slides, University of Minnesota, MIS Research Denter, Mar. 10, 2006.
"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

* cited by examiner

FIG. 3

METHOD, APPARATUS, AND COMPUTER READABLE MEDIUM FOR PROVIDING A SELF-SERVICE INTERFACE

CROSS-REFERENCE TO RELATED APPLICATIONS

This application is a continuation-in-part of application Ser. No. 13/839,226, filed Mar. 15, 2013, which in turn claims priority to Provisional Application No. 61/640,647, filed Apr. 30, 2012, a continuation-in-part of application Ser. No. 13/839,414, filed Mar. 15, 2013, which in turn claims priority to Provisional Application No. 61/706,664, filed Sep. 27, 2012, a continuation-in-part of application Ser. No. 13/833,548, filed Mar. 15, 2013, which in turn claims priority to Provisional Application No. 61/618,338, filed Mar. 30, 2012, a continuation-in-part of application Ser. No. 13/922,750, filed Jun. 20, 2013, a continuation-in-part of application Ser. No. 13/913,887, filed Jun. 10, 2013, a continuation-in-part of application Ser. No. 13/929,253, filed Jun. 27, 2013, and a continuation-in-part of application Ser. No. 13/749,272, filed Jan. 24, 2013, all of which are hereby incorporated by reference in their entireties.

FIELD

Embodiments of the invention relate, generally, to providing an interface to a commerce system and, more particularly, to a method, apparatus, and computer readable medium for providing a merchant self-service interface.

BACKGROUND

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide discounts to consumers have been identified. Initial registration and setup to allow a merchant to provide promotions using a promotion system is typically a lengthy and involved process. This process may include separate steps by representatives of a promotion and marketing service to verify that a user who wishes to create a promotion is an authorized representative of the merchant, and that promotion offers prepared by the merchant are valid and likely to be of interest to consumers. The hands-on nature of the promotion generation process means that the process is not scalable as the number of merchants accessing the system increases, since each merchant must interact with a staff member of the promotion and marketing service for verification, promotion generation, and various other steps in the process. As more and more merchants join the system, more and more staff members are required to meet the needs of these merchants in a reasonable time frame.

Through applied effort, ingenuity, and innovation, many of these identified problems have been solved by developing solutions that are included in embodiments of the present invention, many examples of which are described in detail herein.

BRIEF SUMMARY

In general, embodiments of the present invention provide herein systems, methods and computer readable media for programmatically registering and verifying a merchant, and allowing the merchant to generate and/or revise promotion offers. In providing such functionality, the system can be configured to, for example, monitor and analyze various promotion offers, including current promotion offers and analytics data about promotion-related purchases, that enable the system to determine the relative successfulness of a promotion offer for a merchant and/or category of merchant. These promotion offers may be indexed with a set of merchant self-service indicators, such that when a new merchant registers with the system, the system determines the merchant self-service indicators for the newly added merchant and suggests promotions associated with those merchant self-service indicators. Upon determining what has been more successful or is expected to be a more successful promotion offer for the merchant based on the merchant self-service indicators, the system can present the generated promotion offer to the newly registered merchant for approval and/or make the promotion offer to consumers programmatically by a promotion and marketing service located remotely from the merchant device and the consumer device. In some embodiments, the remotely located promotion and marketing service may be further configured to revise the promotion offer programmatically and/or upon receiving the merchant's approval of the proposed edits to the promotion offer.

Embodiments may include methods, apparatuses, and computer program products for providing a merchant self-service interface. Some embodiments may include a method for providing a merchant self-service interface. The method may include identifying a merchant and providing an interface to the merchant. The interface may provide an interface control that allows the merchant to generate a promotion. The method may also include receiving an indication via the interface of a promotion type, wherein the promotion type defines at least one of a product or a service provided by the merchant. The method may further include presenting the merchant with a promotion template associated with the promotion type, wherein the promotion template defines at least one promotion parameter for the promotion, generating the promotion, and publishing the promotion via a promotion and marketing service.

Some embodiments may include an apparatus for providing a merchant self-service interface. The apparatus may include at least one processor coupled to a memory, the memory comprising computer executable instructions that, when executed by the processor, configure the apparatus. The apparatus may be configured to identify a merchant, and to provide an interface to the merchant. The interface may provide an interface control that allows the merchant to generate a promotion. The apparatus may be further configured to receive an indication via the interface of a promotion type, wherein the promotion type defines at least one of a product or a service provided by the merchant, to present the merchant with a promotion template associated with the promotion type, wherein the promotion template defines at least one promotion parameter for the promotion, to generate the promotion, and to publish the promotion via a promotion and marketing service.

Some embodiments may include a computer program product including instructions for providing a merchant self-service interface. The computer program product may include instructions that, when executed by a processor, configure the processor to identify a merchant and to provide an interface to the merchant. The interface may provide an interface control that allows the merchant to generate a promotion. The instructions may further configure the processor to receive an indication via the interface of a promotion type, wherein the promotion type defines at least one of a product or a service provided by the merchant, to present the merchant with a promotion template associated with the promotion type, wherein the promotion template defines at least one promotion parameter for the promotion, to generate the promotion, and to publish the promotion via a promotion and marketing service.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 3 depicts an illustration of a merchant registration interface in accordance with some embodiments described herein;

DETAILED DESCRIPTION

Introduction and Definitions

Figure 1:
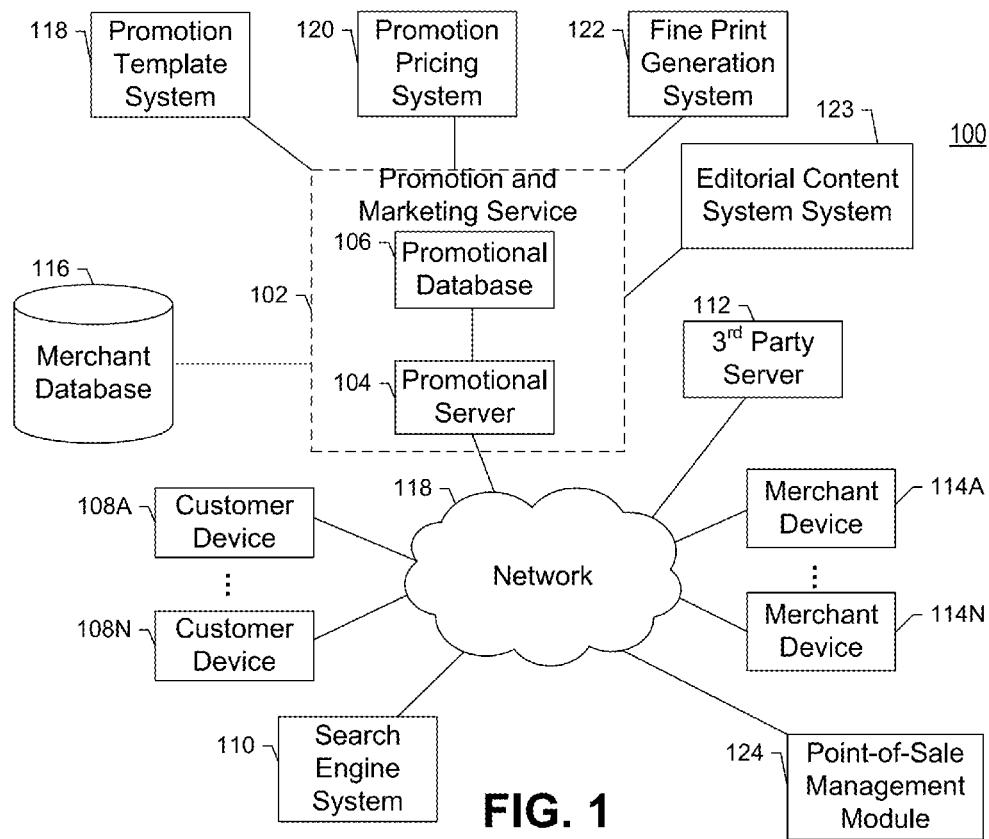
FIG. 1 depicts an example system in accordance with some embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

Overview

As described above, the inventors have identified various problems and difficulties that occur in providing merchants with the opportunity to create and sell promotions. In particular, the process of generating a new promotion requires direct manual intervention at several stages to avoid breaches of security, to ensure a minimum quality level of promotions provided by the system, and to provide promotions that are of interest to consumers. As a result of these problems and others that may arise from time to time, delays and inefficiencies may be introduced into the process of generating a new promotion. Furthermore, increased levels of manual oversight increase the man-hours needed to service the needs of merchants in a timely manner, resulting in increased overhead costs which may be passed on the merchant or consumers.

Accordingly, to overcome these problems, example embodiments of the present invention are shown in order to provide self-service capabilities for merchant interactions with a promotion and marketing service. Such self-service capabilities may offer merchants the ability to register with the promotion and marketing service, to verify their identity, to select various parameters and implementation details for a particular promotion, to submit the promotion parameters for approval, to receive approval of the parameters of the generated promotion, and to publish the generated promotion to consumers for purchase via the promotion and marketing service.

The promotion and marketing service may provide these self-service capabilities to provide merchants with various levels of control over the promotion generation process. For example, embodiments may perform automatic verification of merchant identity, detection and determination of various promotion characteristics based on the merchant identity, determination and suggestion of default promotion parameters for selection by the merchant, determination and suggestion of terms and conditions to the merchant, analysis of promotion statistics to suggest promotion pricing terms, and verification of promotion parameters prior to publication.

In the context of the present application, the term "merchant self-service indicator" relates to data associated with the merchant that may be used to identify a set of deal parameters for suggesting a deal to the merchant. For example, the merchant self-service indicator may be a feature or characteristic of the merchant, such as a the type of industry of the merchant, the type of products or services sold by the merchant, the size of the merchant, the location of the merchant, the sales volume of the merchant, reviews and ratings for the merchant, or the like. In some embodiments, the merchant self-service indicators are a result of analytics that allow for generation of deals that are ideal for the particular merchant's circumstances. For example, the merchant self-service indicators may be used to identify optimal deals for the particular merchant based on their exact location (e.g. the particular city street of the merchant as opposed to a wider range, such as a zip code), the merchant's exact products and services offered (e.g., pizzerias that only serve deep dish pizza, restaurants that become nightclubs after 11:00 pm), the merchant's price point (e.g., barbershops that charge more than $20 for a haircut), or the date or season of the year (e.g., offering ski equipment during the winter, or holiday themed promotions during the holiday season), or the like. These merchant self-service indicators may be used to identify deal parameters that were used by other merchants that share one or more same or similar merchant self-service indicators. For example, after initial registration and verification, the promotion and marketing system may identify the merchant self-service indicators associated with the newly registered merchant, such as by looking up the merchant in a merchant database or by receiving the merchant self-service indicators directly from the merchant (e.g., by a fillable form). The identified merchant self-service indicators may be cross-referenced with deal offers from other merchants to identify deal offers that were successful for other merchants with the same or similar merchant self-service indicators. Successful deal offers for merchants with similar merchant self-service characteristics may be used to generate a suggested promotion for the newly registered merchant, and the newly registered merchant may confirm the suggested promotion to offer the promotion to consumers via the promotion and marketing service. The promotion and marketing service may also provide an interface allowing the merchant to edit or otherwise modify the suggested promotion before confirmation.

The term "promotion content" may be understood to refer to cosmetic display factors that influence how the promotion is displayed to consumers. For example, promotion content may include an image associated with the promotion, a narrative description of the promotion or the merchant, a display template for association with the promotion, or the like. For example, the merchant self-service indicators may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

Different merchants may receive different pricing from the promotion system based on different factors. For example, merchants that have higher sales volume (and thus are more likely to sell promotion offers), or that are perceived as higher quality (and thus are more desirable) may be offered preferable pricing over smaller or lower quality merchants. In this regard, the promotion and marketing service may adjust the pricing of promotion offers based on the merchant self-service characteristics to adjust pricing for the particular merchant. For example, the price of promotion offers offered to the merchant may be adjusted so that the merchant is guaranteed a positive return on their investment, promotion offer prices may be adjusted based on the size or volume of the merchant, or any other adjustment may be made to the promotion offer parameters as appropriate for the merchant self-service indicators of the particular merchant. Additionally or alternatively, promotion content, such as promotion narratives, images, or other cosmetic features that are presented to a user in connection with the promotion offer, may also be generated using the merchant self-service indicators.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives and merchants may access a promotion and marketing service 102 via a network 118 (e.g., the Internet, or the like) using computer devices 108A through 108N and 114A through 114N, respectively (e.g., one or more customer devices 108A-108N or one or more merchant devices 114A-114N). Moreover, the promotion and marketing service 102 may comprise a promotional server 104 in communication with a promotional database 106. The promotion and marketing service 102 may further have access to a merchant database 116 storing information about a plurality of merchants, such as may include but is not necessarily limited to merchants operating the one or more merchant devices 114A-114N. In some embodiments, the promotion and marketing service 102 may also communicate with a search engine 110 to list and/or index promotions offered by the promotion and marketing service 102. The promotion and marketing service 102 may be operable to facilitate self-service operations to allow a merchant to generate a promotion to be offered to consumers via the promotion and marketing service 102. In order to facilitate these self-service operations, the promotion and marketing service 102 may access, interface with, or communicate with a promotion template system 118, a promotion pricing system 118, a fine print generation system 122, an editorial content system 123, and/or a point-of-sale management module 124. It should be readily appreciated that also the promotion template system 118, a promotion pricing system 118, a fine print generation system 122, an editorial content system 123, and/or a point-of-sale management module 124 are depicted as separate elements in communication with the promotion and marketing service 102, these systems and modules may also be present within the promotion and marketing service 102. For example, these systems and modules may be implemented as one or more applications or circuitry executing within or upon the promotional server 104.

The promotion template system 118 may function to identify, generate, suggest, and/or provide access to one or more promotion templates. These promotion templates may define a particular promotion structure to be used for a particular promotion based on various factors, including but not limited to the particular merchant, the type of product or service being sold, the merchant's location, the date, the season, or the like. The promotion templates may define a grammar that allows for insertion of data relevant to the particular promotion (e.g., the merchant's address or contact information). In some embodiments, the promotion templates may be identified using past promotion performance data to select an "optimal" promotion template for a particular merchant, good or service, or the like. For example, the promotion template system 118 may collect analytics on the use of particular terms and template structures to generate templates that are more likely to be of interest to consumers. Example operations of a promotion template system 118 are described further in U.S. patent application Ser. No. 13/922,750, filed Jun. 20, 2013, which is herein incorporated by reference in its entirety.

The promotion pricing system 120 may be employed to determine and suggest various price terms to be associated with a newly generated promotion. For example, the promotion pricing system 120 may identify an optimal discount level off a retail price that will result in the sale of a particular number of promotions. The promotion pricing system 120 may further identify a price term to be used by a promotion and marketing service to be charged to the merchant for the use of the promotion and marketing service. Determination of these price terms may be performed by the promotion pricing system 120 through analysis of various factors, including but not limited to economic indicators associated with the location of the merchant, past performance of promotions for the same or a similar location, type of product or service, or merchant, or the volume of business the merchant has done with the promotion and marketing service. Example operations of a promotion pricing system 120 are described further in U.S. patent application Ser. No. 13/913,887, filed Jun. 10, 2013, which is herein incorporated by reference in its entirety.

The fine print generation system 122 may be employed to determine and suggest terms and conditions for a newly generated promotion. These terms and conditions may relate to so-called "fine print" of the promotion, which may include, but is not limited to, a quantity of promotions, a redemption deadline, a promotion limit per customer, a promotion limit per visit, instructions for redemption, locations for redemption, and the like. In some embodiments, the fine print generation system 122 may present the merchant with a set of possible selections for terms and conditions. These selections may be presented in the form of a "Wizard" or "Expert System" which prompts the merchant with a series of questions to assist with selection of terms and conditions for the newly generated promotion. Example operations of a fine print generation system 122 are described further in U.S. patent application Ser. No. 13/929,253, filed Jun. 27, 2013, which is herein incorporated by reference in its entirety.

The editorial content system 123 may be employed to generate and/or modify promotion content for a promotion. For example, the editorial content system 123 may generate or select default content (e.g., a default title, promotion description, or an image to be associated with the promotion) for the promotion. In some embodiments, the default content may be augmented or modified with custom content generated for the merchant by the editorial content system. In some embodiments, the promotion content may be generated by asking the merchant one or more questions (e.g., a "Wizard" content generation system), and customizing the content based on the answers to the questions provided by the merchant.

The point-of-sale management module 124 may function to enable a merchant to interface with a merchant point-of-sale or inventory system to facilitate generation of promotions. For example, the point-of-sale management module 124 may determine which products or services are being sold by the merchant to identify appropriate products and services for newly generated promotions (e.g., suggesting promotions directed to products or services of which the merchant has excess inventory, or suggesting promotions directed to products in which the merchant appears to specialize). In some embodiments, the point-of-sale management module 124 may also interface with a merchant online storefront to perform similar functions. The point-of-sale management module 124 may also be configured to provide transaction data to the promotion and marketing service for determining the type and value of goods sold. Example operations of a point-of-sale management module 124 are described further in U.S. patent application Ser. No. 13/839,226, filed Mar. 15, 2013, and U.S. patent application Ser. No. 13/839,414, filed Mar. 15, 2013, which are hereby incorporated by reference in their entirety.

Figure 2:
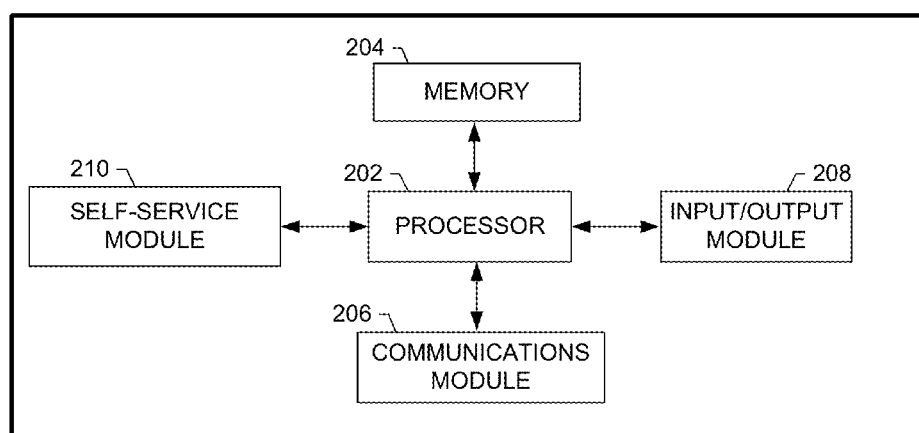
FIG. 2 depicts a schematic block diagram of circuitry that can be included in a computing device, such as a merchant machine, consumer machine and/or promotion and marketing system, in accordance with some embodiments described herein.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, and a self-service module 210. The apparatus 200 may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or nonvolatile memories. In other words, for example, the memory may be an electronic storage device (e.g., a computer readable storage medium). The memory 204 may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The self-service module 210 may be operable to facilitate interactions between a merchant and the promotion and marketing service 102 to enable the merchant to generate and manage promotions offered by the promotion and marketing service. For example, the self-service module 210 may provide a user interface by which the merchant may provide a set of parameters via a web page interface or a server interface for a client application executing on a merchant device. These parameters may define a new promotion to be offered by the promotion and marketing service. The self-service module 210 may interface with and/or embody various additional modules, systems, and/or components in order to facilitate generation and management of promotions offered by merchants using the promotion and marketing service. These modules, systems, and/or components may include, but are not necessarily limited to the promotion template system 118, promotion pricing system 120, fine print generation system 122, and/or point-of-sale management module 124 described above.

The self-service module 210 may also function to manage the merchant's relationship with the promotion and marketing service 102. For example, the self-service module 210 may associate a user account with a particular merchant, verify the identity of the merchant, provide the user account with the proper credentials to allow the user account to generate promotions on behalf of the merchant, and verify that the values provided for the promotion are valid. The self-service module 210 may also access historical data associated with promotions offered by the merchant and other merchants to provide analytics data and suggested promotion parameters to the merchant during a self-service operation. Example operations of the self-service module 210 and merchant self-service systems are further described in U.S. Provisional Patent Application 61/618,338, filed Mar. 30, 2012, U.S. patent application Ser. No. 13/833,548, filed Mar. 15, 2013, and U.S. patent application Ser. No. 13/749,272, filed Jan. 24, 2013, and U.S. patent application Ser. No. 14/038,610 which are each herein incorporated by reference in their entirety. Example interfaces such as may be provided by the self-service module 210 are described further below with respect to FIGS. 3-4. Some example operations of the self-service module 210 are described further below with respect to FIGS. 5-7.

It should be readily appreciated that the self-service module 210 and the communications module 206 may, like other components of the apparatus 200, have related and/or overlapping functionality, and that these modules may be implemented as a single module or multiple discrete modules.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 depicts an illustration of a merchant registration interface in accordance with some embodiments described herein. The merchant registration interface may be used to gather information about a merchant interacting with the self-service interface. For example, a merchant may access a website hosted by a promotion and marketing service and be presented with the merchant registration interface depicted in FIG. 3 as part of an account creation process with the promotion and marketing service. The merchant registration interface may provide the merchant with the ability to provide information about their business, such as the merchant's location, contact information, and types of goods and services sold. This information may be collected and used as or to derive one or more merchant self-service indicators for the newly registered merchant. In some embodiments, the merchant registration interface may be provided to the merchant each time a promotion is to be generated, while in other embodiments the merchant registration interface may be used to generate a merchant profile during account creation. The self-service interface may also provide the merchant with the ability to modify or delete information provided by the merchant registration interface after the registration operation is completed.

FIGS. 4A-4F depict illustrations of example components of a merchant self-service interface in accordance with some embodiments described herein. The merchant self-service interface of FIGS. 4A-4F guides a merchant through the process of creating a promotion to be offered by the promotion and marketing service. The interface illustrations 4A-4F illustrate the process of generating a promotion, which, in this example case, offers a manicure/pedicure service at a discounted price. These interface illustrations will now be discussed in further detail to describe how the merchant may utilize the self-service interface to generate the promotion.

Figure 4A:
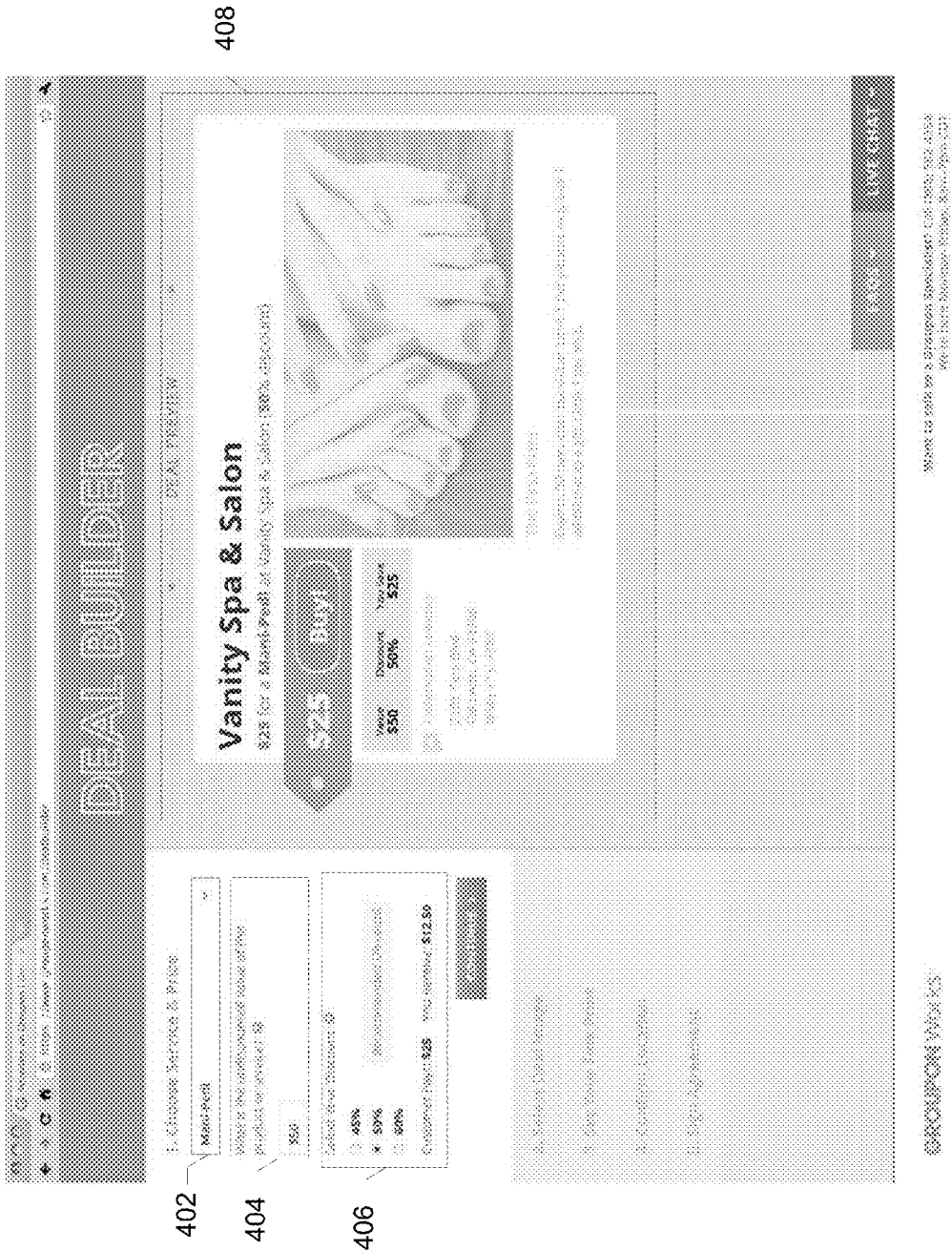
FIGS. 4A-4F depict illustrations of example components of a merchant self-service interface in accordance with some embodiments described herein.

FIG. 4A depicts a first interface that allows the merchant to provide basic information about the promotion. The interface includes a drop-down interface control 402, allowing the merchant to select the service for which the promotion will be provided. In the instant example, the merchant has selected a "mani-pedi" service. In some embodiments, the drop-down interface may be populated with products and/or service related to the merchant. For example, the merchant interacting with the interfaces of FIGS. 4A-4F is a salon, so salon based services such as manicures, pedicures, massages, facials, and the like may be offered. The list may be populated with appropriate promotion types based on the merchant self-service indicators, such as information provided by the merchant during a registration operation.

In some embodiments, selection of a product or service may populate other elements of the self-service interface via selection of a promotion template. For example, a promotion template may specify a set of default values for each interface control, which may then be modified or adjusted by the user. In some embodiments, the merchant may be presented with multiple templates from which to choose. Templates may control various aspects of the promotion, including but not limited to the content of the promotion (e.g., images, text), the terms and conditions of the promotion, and the prices and parameters of the promotion (e.g., cost to the consumer, value of the product or service offered, fee charged to the merchant). The templates may, for example, be selected and provided via a promotion template system 118 as described above with respect to FIG. 1.

The merchant may be prompted to enter an undiscounted promotion value via a promotion value interface control 404. The promotion value interface control 404 may be used to determine the base value of the promotion. Although the instant example depicts an interface control to receive merchant input, it should be readily appreciated that the promotion value may be determined by alternative methods as well. For example, the promotion value may be determined based on a price list previously provided by the merchant, based on an interaction with a merchant point-of-sale system (e.g., determining the price based on how much the product or service based on how much the merchant typically charges), based on analysis of market conditions relating to the product or service, or the like. Similarly, the promotion value interface control 404 may be presented to a merchant as a range of values, such as a slider control with a maximum and minimum value determined programmatically by the promotion and marketing service.

The merchant may be prompted to enter a discount value via a discount interface control 406. The discount value may allow the merchant to adjust the discount offered via the promotion to consumers that purchase the promotion. As with the promotion value interface control 404, the discount interface control 406 may be programmatically populated with a discount value based on various factors associated with the merchant, the product or service, market conditions, and the like.

As the merchant selects interface controls from the merchant self-service interface, the result of the selection may be displayed to the merchant via a promotion preview 408. The promotion preview may provide a representation of how the promotion will appear when hosted by the promotion and marketing service. As the merchant makes selections via the merchant self-service interface, the promotion preview may automatically update to reflect the selections.

Figure 4B:

FIG. 4B depicts a promotion image selection interface. The promotion image selection interface may allow a merchant to select visual content, such as a particular image, to be displayed with the newly generated promotion when hosted by the promotion and marketing service. A selected promotion image 410 may display the currently selected image for association with the promotion. The merchant may be presented with an image selection control 412 allowing for selection of alternative images. For example, as the merchant selects different buttons presented via the image selection control 412, the selected promotion image 410 may change to reflect the selection. In some embodiments, the images available to selection by the merchant are provided by an editorial content system 123 as described above with respect to FIG. 1. In some embodiments, the merchant may also be provided with an interface control to allow the merchant to upload an image for association with the promotion.

Figure 4C:
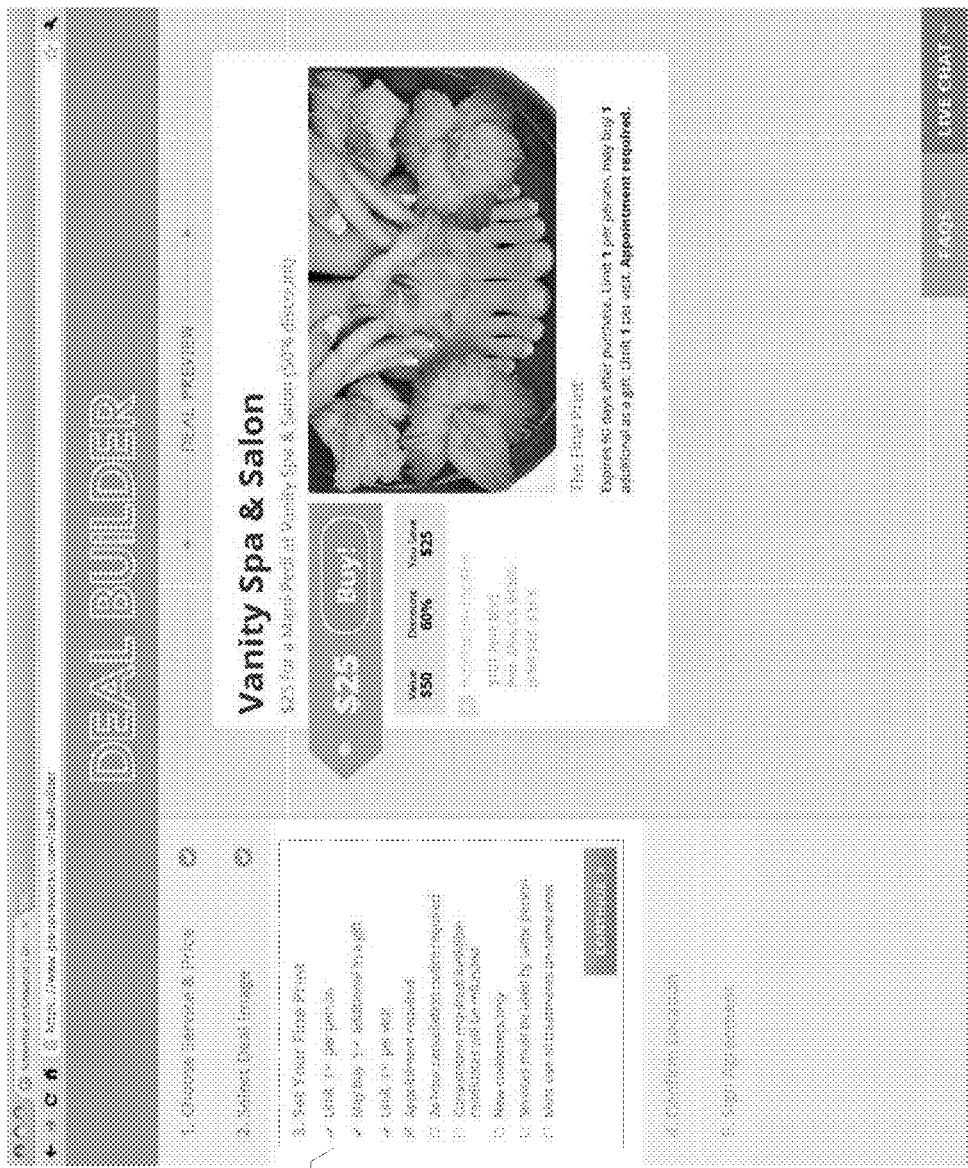

FIG. 4C depicts a fine print selection interface. The fine print selection interface may allow the merchant to select terms and conditions to be associated with the promotion being generated via the self-service process. The fine print selection interface may include a fine print selection control 414 to allow the merchant to select particular terms and conditions, such as a quantity per consumer, a quantity per visit, whether notice is required for cancellation, or the like. The fine print selection control 414 may be presented as a series of check boxes or radio buttons, allowing the merchant to configure the terms and conditions for the promotion. As with other aspects of the merchant self-service interface, certain terms and conditions may be pre-selected or unselected for the particular promotion based on various merchant self-service indicators. In some embodiments, the fine print selection interface is provided in conjunction with the fine print generation system 122 as described above with respect to FIG. 1.

Figure 4D:
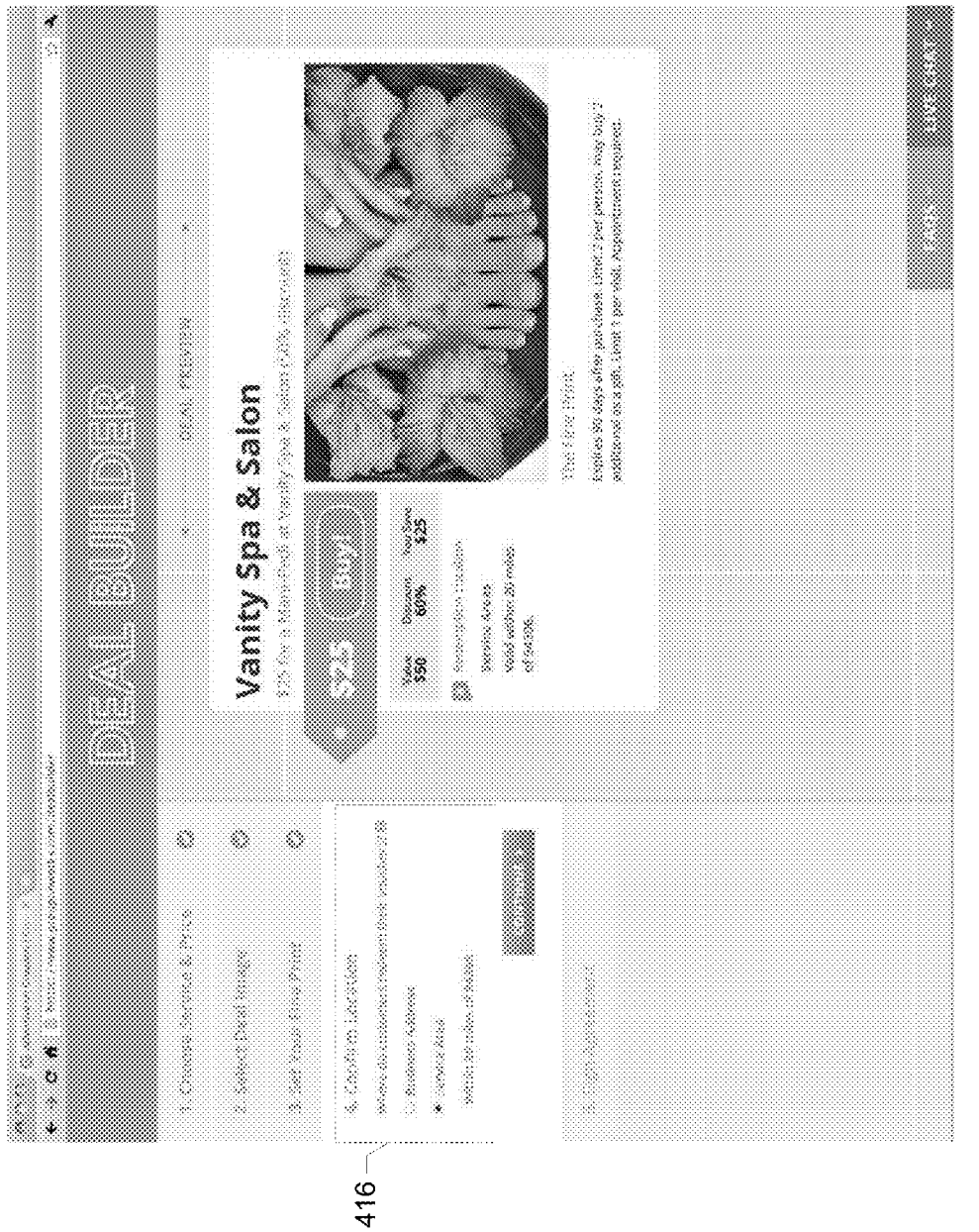

FIG. 4D depicts a location selection interface. The location selection interface may allow a merchant to associate a promotion with a particular location, such as enabling the promotion for a particular store location, or to market the promotion to consumers in a particular area. The location selection interface may include a location selection control 416 that allows the merchant to input a particular address (e.g., the location of the merchant's storefront or a particular storefront to be associated with the promotion), or a particular geographical area, such as a radius around a certain location (e.g., within a certain distance of a particular zip code). This location information may be used to market the promotion to particular consumers. In some embodiments, the location information is automatically populated based on merchant self-service indicators. For example, the location the merchant specifies during registration may be used as a default location.

Figure 4E:
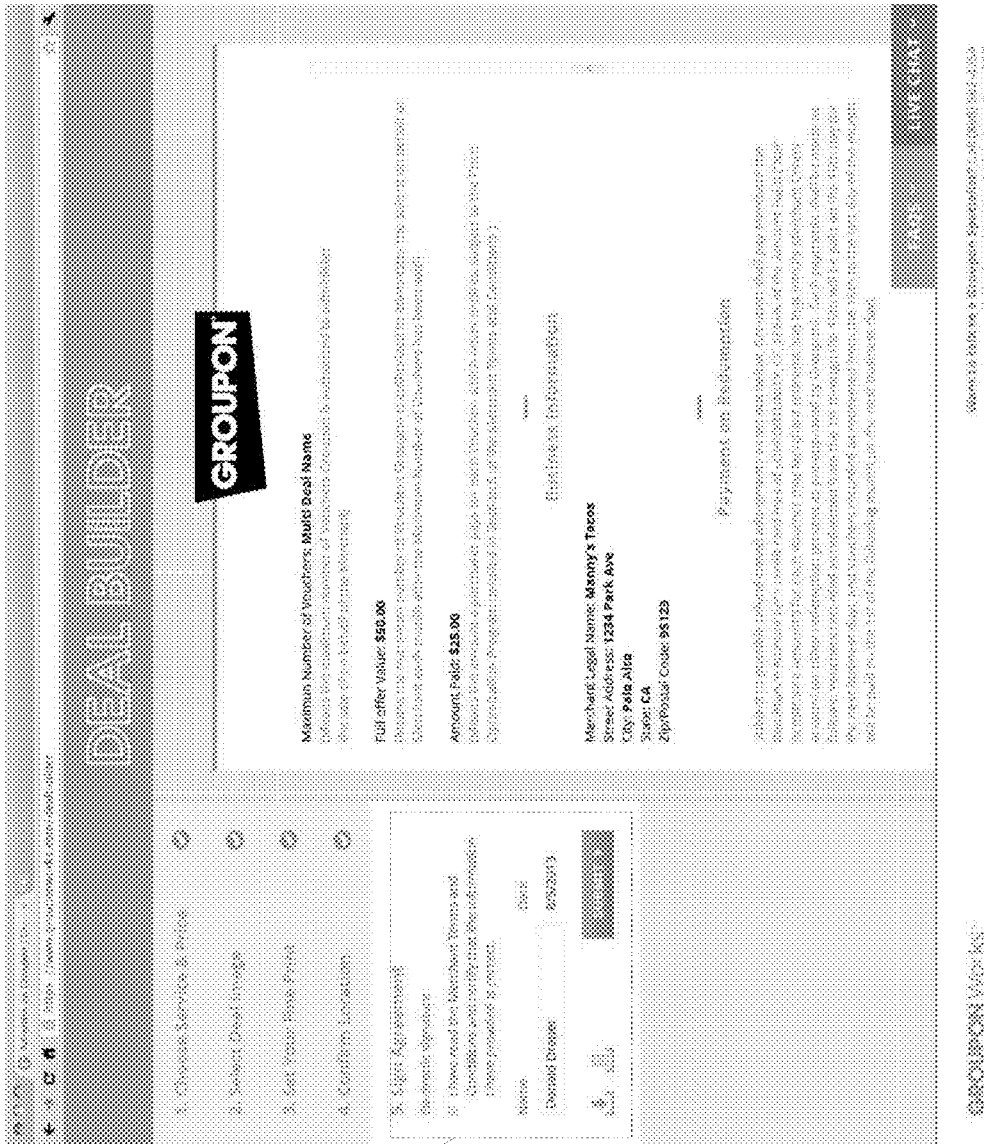

FIG. 4E depicts a confirmation interface. The confirmation interface may allow the merchant to confirm the details of the promotion and publish the promotion to the promotion and marketing service to allow consumers to purchase the promotion. The confirmation interface may include an agreement memorializing the aspects of the promotion selected by the merchant during the merchant self-service process. For example, the good or service, quantity, price, and fee may be included in the agreement. The agreement may also include various terms and conditions for doing business with the promotion and marketing service. These terms and conditions may provide rules governing the relationship between the merchant and the promotion and marketing service. The confirmation interface may include a confirmation control 418 allowing the merchant to indicate that the merchant agrees with the terms and conditions for publishing the promotion. In some embodiments, selection of the confirmation control 418 may cause publication of the promotion to consumers. In some other embodiments, selection of the confirmation control 418 may send the promotion to an approval system for approval. The approval system may be curated by one or more administrators, or the approval system may be automated for programmatic approval of the promotion. For example, an approval system may automatically approve promotions that meet certain parameters for price, quality, or the like as determined by the approval system.

Figure 4F:

FIG. 4F depicts a completed promotion interface. The completed promotion interface may provide the merchant with a view of their completed promotion 420 for review. In some embodiments, the completed promotion interface may display the completed promotion 420 as it is visible to consumers via the promotion and marketing service. In some embodiments, the completed promotion interface may include or more interface controls allowing the merchant to manage the completed promotion 420, such as viewing analytics associated with the promotion, removing the completed promotion 420 from the promotion and marketing service, editing the completed promotion 420 (e.g., fixing typographical errors or changing the image associated with the promotion), or the like.

Figure 5:
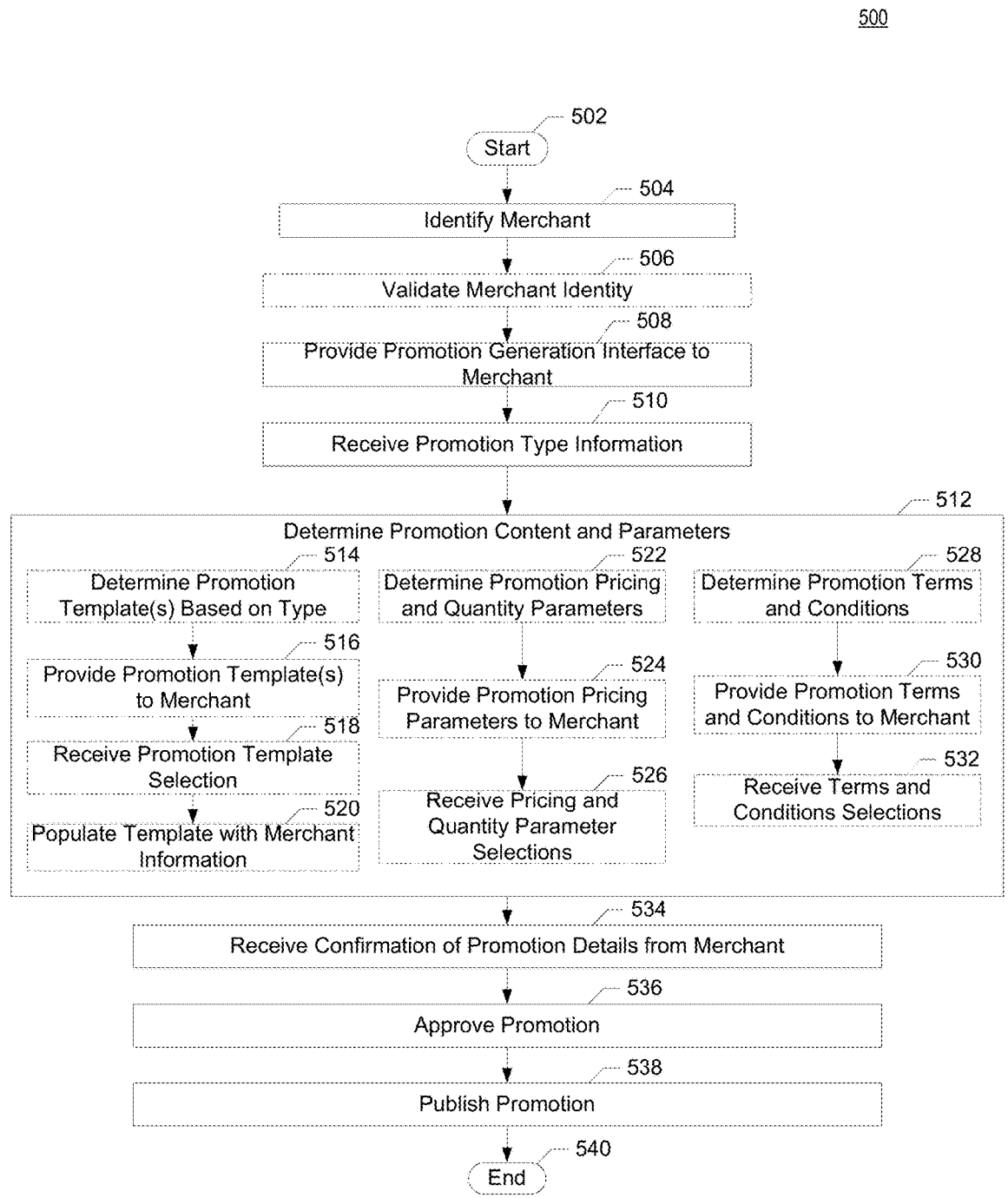
FIGS. 5-7 depict flow charts showing exemplary processes for providing a merchant self-service interface in accordance with some embodiments described herein.
Figure 6:
Figure 7:
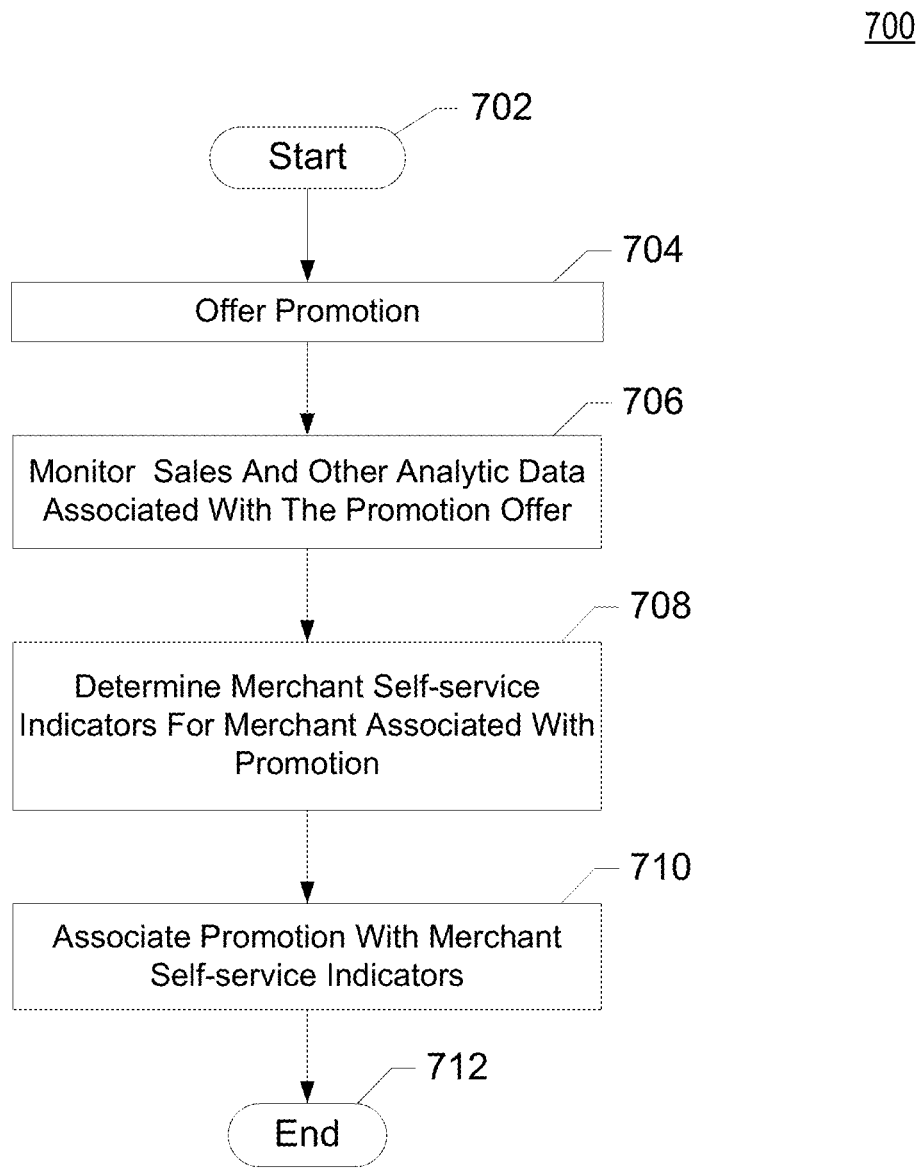

FIGS. 5-7 show example methods, namely processes 500, 600, and 700 that may be executed by one or more machines (some examples of which are discussed in connection with FIGS. 1 and 2), in accordance with some embodiments discussed herein. These processes may be performed by computing devices as known in the art and described above with respect to FIGS. 1 and 2.

FIG. 5 depicts an example process 500 for providing merchant self-service. The process 500, when completed, allows a merchant to provide information to a promotion and marketing service to enable that promotion and marketing service to offer one or more promotions to consumers that are redeemable with the merchant for goods and services. The process 500 may provide merchants with the ability to generate one or more such promotions without the need for direct intervention with employees of the promotion and marketing service.

At action 502, the process 500 begins, such as upon receiving an indication from a merchant to begin the self-service process. The process 500 proceeds to action 504, wherein the merchant is identified. The merchant may be identified based on user account credentials, such as by providing a login name and password associated with a particular merchant. In some embodiments, such as where the merchant is newly registering with the promotion and marketing service and has not yet established account credentials, identification of the merchant may be performed by the merchant providing contact information, such as the merchant's name, address, or phone number. Identification of the merchant may provide the promotion and marketing service with merchant self-service indicators that are employed to inform the self-service process. For example, the merchant type, the merchant location, historical promotion sales for the merchant, and other merchant self-service indicators may be used to assist with selection of promotion templates, promotion content, promotion pricing, and the like. In some embodiments, the promotion and marketing service may independently determine some or all of the merchant identification information, such as by accessing a browser cookie associated with the user's browsing session or by identifying the internet protocol address used by the user.

At action 506, the process 500 may optionally validate the identity of the merchant. Validation of the merchant identity may occur by contacting the merchant via a known contact method for the merchant (e.g., a phone number or e-mail address stored in an external merchant information database that is confirmed to be correct for the merchant with whom the user purports to be associated). Validation of the identity of the merchant in this manner may ensure that the merchant interacting with the self-service system is an authorized representative of the merchant for which the promotion is generated.

At action 508, an interface may be provided to the merchant to allow the merchant to generate a new promotion. For example, the merchant may select from a menu option indicating the merchant wishes to generate a new promotion, and the promotion generation interface may be provided to the merchant in response to selection of the menu option. The promotion generation interface may allow the merchant to input a promotion type (e.g., a type of good or service which the merchant wishes to promote). In some embodiments, the merchant may be provided with a list of possible promotion types based on merchant self-service indicators, such as the type of merchant (e.g., food promotions for a restaurant, massage promotions for a spa, etc.).

At action 510, promotion type information is received. The promotion type information may be based on a menu selection performed by the merchant, or a default promotion type may be selected for the merchant based on certain merchant self-service indicators. In some embodiments, the merchant may be provided with the ability to select an alternate promotion type instead of the default promotion type.

At action 512, content and parameters may be determined for the promotion to be generated by the self-service interface. As described above, various modules and systems may be employed to assist the merchant with selection of the various elements of the promotion, including but not limited to narrative content (e.g., images and text to be displayed to a consumer), promotion parameters (e.g., how the promotion will be redeemed, the redemption value, the type of goods and services offered in exchange for the promotion, and the like), promotion pricing terms (e.g., the fee charged to the merchant by the promotion and marketing service), and/or the terms and conditions of the promotion (e.g., the "fine print"). Determination of the content and parameters for the promotion may also entail providing the merchant with analytic data for past promotions and respected return-on-investment calculations to assist the merchant with generating the promotion.

Selection of the content and parameters for the promotion may include the use of a promotion template, as described above. For example, at action 514 the process 500 may identify several promotion templates for promotion content that have previously been successful for promotions of the same type, and allow the merchant to choose from among the identified promotion templates at action 516. Additionally or alternatively, the merchant may select a blank template to input their own content, or the merchant may be provided with the ability to edit one or more proposed templates. At action 518, the merchant may select a template and at action 520, the template may be populated with values for insertion into the promotion by the merchant. In some embodiments, the template may be automatically populated with information related to the merchant, such as the merchant name, contact information, or product name. In some embodiments, the merchant may be presented with multiple content offerings for selection. For example, the merchant may be provided with a number of images determined based on the promotion type, and the merchant may select one of the images to be displayed alongside of the promotion.

Determination of the content and parameters for the new promotion may also include determining pricing and quantity parameters for the promotion, such as the fee to be charged to the merchant by the promotion and marketing service. At action 522, the process 500 may determine promotion parameters (e.g., quantity or price terms) or range of parameters for the promotion that will be acceptable to both the merchant and the promotion and marketing service. The merchant may be presented with the determined parameters at action 524. For example, the merchant may be presented with a selection of pricing parameters that ensure a minimum return-on-investment for the merchant while also maximizing revenue for the promotion and marketing service. In some embodiments, the merchant may be presented with one or more sliders that are dependent upon one another, such that as one price parameter is adjusted by the merchant, other parameters move in concert. For example, the promotion and marketing service may charge a smaller fee per promotion sold if the merchant increases the volume of promotions to be offered. As another example, as the merchant increases the price for each promotion, the process 500 may estimate that fewer promotions will be sold, lowering the expected revenue for the promotion and marketing service. As such, the fee charged per promotion may increase to ensure positive revenue for the promotion and marketing service in response to an increase in the purchase price of the promotion by the merchant. At action 526, the merchant's price and quantity parameter selections may be received.

Determination of the content and parameters for the new promotion may also include selection of certain terms and conditions to be associated with the new promotion. For example, at action 528, the process 500 may determine a set or plurality of sets of terms and conditions for consideration by the merchant. These determined terms and conditions may be identified based on various merchant self-service indicators, such as the merchant's past promotions, the type of promotion, the location of the merchant, or the like. At action 530, these terms and conditions may be provided to the merchant for selection and/or editing. At action 532, the merchant's selections for the terms and conditions may be received and incorporated into the new promotion.

It should be readily appreciated that the above examples merely reflect examples of the processes that may be employed to determine the promotion content and parameters described at action 512. Determining of the promotion content and parameters may also be performed using various additional analytic and historical data. In some embodiments, the methods described herein may be utilized in concert with one another (e.g., analyzing the impact of fine print selections on the optimal price parameters for the promotion). Determination of the promotion content and parameters may also include presenting the merchant with analytic data for the merchant's past promotions and/or similar promotions offered by other merchants, thus assisting the merchant with making an informed decision when generating the promotion.

At action 534, the merchant may be presented with the opportunity to confirm the details of the promotion. As described above, the merchant may be presented with a set of default content and parameters for the promotion, which may be edited during the process described with respect to action 512. The merchant may review the details of the promotion and submit the promotion for approval by the promotion and marketing service.

At action 536, the newly created promotion may be approved by the promotion and marketing service. Approval of the promotion may include manual or automatic verification that the content of the promotion is suitable for use with the promotion and marketing service. For example, a representative of the promotion and marketing service may perform quality control of newly generated promotions to ensure that the promotions are valid (e.g., associated with a valid merchant) and that the promotions meet quality standards (e.g., editing for spelling errors and typographical errors in promotion text) and market standards (e.g., the promotion offers at least a minimum discount to make the promotion worth the time of the consumer to purchase). In some embodiments, approval may be performed in an automated manner. For example, the process 500 may determine that the newly generated promotion falls within a certain range of values that have been approved in the past for the same or similar promotions.

At action 538, upon approval of the promotion, the promotion may be published via the promotion and marketing service. Publication of the promotion may include providing the promotion for purchase to consumers, such as via an e-commerce interface (e.g., a web page or application) offered by the promotion and marketing service. The process ends at action 540.

FIG. 6 shows process 600, which is an example of an algorithm that may be used to automatically generate programmatically proposed promotion content and parameters based on merchant self-service indicators. The process 600 may be performed in response to an initial merchant registration, such as described above. For example, upon initial registration, the process 600 may generate a promotion offer from merchant self-service indicators identified or otherwise derived using merchant identification information provided during the registration process. The actions of the process 600 describe various merchant self-service indicators such as merchant category, geographic area, customer purchase histories, and the like. Although several specific merchant self-service indicators are enumerated, this should not be understood to be an exhaustive list, and various other merchant self-service indicators or combinations of merchant self-service indicators may also be employed to identify suggested promotions for merchants during the initial registration process. The process 600 begins at action 602. The process 600 describes how these merchant self-service indicators may be used to inform generation of the new promotion. For example, these self-service indicators may be used in selection of content and parameters for a particular promotion as described with respect to action 512 of FIG. 5, above.

At 604, the process may analyze promotion parameters associated with other merchants in the merchant's category. For example, the promotion and marketing service can promote a plurality of merchants that are categorized together by the promotion and marketing service. For example, the promotion and marketing service may offer promotions and/or otherwise promote businesses that provide spa treatments. Each of these businesses can be categorized by the promotion and marketing service as a spa. As another example, businesses that serve food and drink after payment is received can be categorized as a "Deli/Coffee Shop" by the promotion and marketing service. In some embodiments, there may be broader categories and/or sub-categories. For example, a "Spa" category may include a subcategory for a "Facial Specialist," and itself may be a subcategory for the broader "Health and Beauty" category. As another example, a "Deli/Coffee Shop" category may be a subcategory of a "Restaurants" category, which may itself be a subcategory of a "Food and Drink" category. Promotion parameters for each category/subcategory of merchants can be assigned a value related to how successful or unsuccessful they are (e.g., how well they sell and how much profit they make the respective merchant), and can be used in determining proposed parameters for the merchant benefiting from process 600. In this manner, promotion parameters employed by other merchants in the same category as the newly registered merchant may be used to generate an initial promotion for the newly registered merchant.

At 606, the processor can be configured to analyze promotion parameters associated with other merchants in the merchant's geographic area. For example, certain neighborhoods may attract people willing to spend more money than other neighborhoods. The promotion and marketing service can be configured to take into consideration the merchant's neighborhood when determining proposed promotion parameters. Additional examples of providing real-time promotion offers within a merchant's vicinity are discussed in U.S. Patent Application Publication No. 2011/0313840, filed Mar. 17, 2011, which is herein incorporated by reference in its entirety.

At 608, the processor can be configured to analyze non-promotion analytics associated with the merchant. For example, the merchant's point-of-sale device can be configured to report some or all of the sales information (e.g., dollar amount received, time of day, profitability, etc.) to the promotion and marketing service, regardless of whether the sales information is related to a promotion. As another example, data stored in the merchant database such as the particular products and services offered by the merchant or the price point of said products and services might be examined to assist with generation of a promotion offer. For example, a hair salon charging $13 for a haircut and style might benefit from different promotion offers than a hair salon charging $150 for a haircut and style, or a 5-star hotel might benefit from different promotion offer structures than a 1 star motel. The non-promotion analytics can then be analyzed by the promotion and marketing service to determine, for example, how busy the merchant is currently, when the merchant's busiest/slowest times are historically, when the merchant's most/least profitable times are historically, and/or any other sales-related information. The initial registration process may further include providing access to the merchant's point-of-sale or other relevant information to the promotion and marketing service, such that such data is made available to the promotion and marketing service for promotion generation. Additionally or alternatively, the promotion and marketing service may derive such non-promotion analytic data from various websites (e.g., a merchant website), services (e.g., review sites or marketing databases), and other information not provided directly by the merchant, but otherwise accessible by the merchant system.

At 610, the processor can be configured to analyze the merchant's available product inventory or service availability (e.g., how many open tables at a restaurant, how many open appointments, etc.). Similarly, the processor can be configured to analyze the merchant's calendar and/or any other type of scheduler that is used to help the merchant keep track of inventory and/or service availability and, thus, determine when a merchant may be more likely to benefit from a promotion being offered. For example, the merchant may incorporate a scheduling system such as a system as described in U.S. patent application Ser. No. 13/631,313 filed Sep. 28, 2012, which is herein incorporated by reference in its entirety.

At 612, consumer transactions that are reported to the promotion and marketing service can also be weighed in the algorithm of process 600 for generating proposed promotion parameters. For example, the promotion and marketing service can be configured to determine for which prices and on what types of products consumers are purchasing in a geographic area of the merchant (e.g., within one block, one mile, five miles, ten miles, and/or any other selected distance from the merchant). As such, in response to the promotion and marketing service determining that consumers are purchasing umbrellas at a higher rate than historical norms (i.e., suggesting that it may be raining within a target region), discounts on taxicabs (which may encounter higher demand during rain periods) can be reduced or paused programmatically in response to a central promotion and marketing service determining a promotion offer should be paused in the absence of receiving a merchant request to do so. As another example, in response to determining that consumers are purchasing golf clubs in a club house of a local golf club, promotion parameters may be generated for a practice round at the golf club whereby such newly purchased clubs may be used.

At 614, proposed promotion parameters and content can be generated based on the results of the analyses of 604-612. In some embodiments, additional and/or different analyses may be included in process 600. For example, the merchant may be provided with particular promotion offers targeted for customers with certain characteristics. As such, promotion offers might be generated that are targeted to new customers (e.g., customers who do not currently do business with the merchant), existing customers, customers in a certain proximity to the merchant's place of business, customers already in the physical store location, or the like. The merchant may be presented with a list of such offers tailored to these different customer types, such that the merchant may select, edit, and/or confirm a promotion offer to attract a certain customer demographic. Further, some embodiments can skip to 614 after performing fewer steps and/or after performing any of 604-612. As such, the process 600 can generate proposed promotion parameters based on various analytics related to the merchant's sales information, other merchant's sales information and/or consumer's purchasing information.

The process 600 may then proceed to action 616 and display the proposed promotion parameters for the merchant's approval. For example, a display may be presented at 616 when requested. The process 600 ends at 618.

FIG. 7 shows a process 700, which is an example of an algorithm that may be used to monitor promotion analytics that can be subsequently processed to provide new promotion offers based on merchant self-service indicators (e.g., in accordance with process 600) and/or presented in a display. The process 700 starts at 702.

At 704, a promotion is offered. For example, the promotion and marketing service publishes an advertisement on a website, sends an email, pushes a notification and/or otherwise notifies one or more potential consumers that a promotion is being offered.

At 706, the promotion and marketing service and/or the merchant system can be configured to monitor sales and/or other analytics data associated with the promotion offer. For example, at 706, the promotion and marketing service can be configured to keep track how many promotions have sold, the promotion value, the discount value, how quickly the promotions sold, where the promotions are sold, what other promotions were bought by the same or similar consumers, and/or any other data that may be analyzed by, e.g., process 600.

At 708, merchant self-service indicators are determined for association with the promotion offer. For example, the merchant that generated the promotion may be associated with various merchant self-service indicators, and these indicators may be extracted and associated with the promotion offer. As an example, the type of merchant, the size of the merchant, and the location of the merchant may be associated with the promotion so that other merchants of a similar respective type, size, and location may analyze the promotion and associated promotion analytics to generate promotion parameters for their own use.

At action 710, the promotion offer is associated with the identified merchant self-service indicators. This association may be tracked in a promotional database, such as a database that stores the promotion offers, or in a merchant database, such as a database that stores information about particular merchants. In some embodiments, a promotion and marketing service operates to analyze and link data in a promotional database and a merchant database to identify correlations and other analytics for the purpose of generating parameters for promotion offers. The process 700 ends at action 712 after associating the particular promotion offer with the particular merchant self-service indicators of the merchant for which the promotion was offered.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as the processor 202, as discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., the memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a merchant interface comprising:
   identifying a merchant;
   providing an interface to the merchant, the interface providing an interface control that allows the merchant to generate a promotion;
   receiving an indication via the interface of a promotion type, wherein the promotion type defines at least one of a product or a service provided by the merchant;
   determining a merchant location, historical promotion sales for the merchant, and one or more merchant self-service indicators,
   wherein the self-service indicators comprise at least a merchant category, a geographic area, and customer purchase histories;
   selecting a promotion template based on the promotion type, merchant location, historical promotion sales for the merchant, and the one or more merchant self-service indicators,
   wherein the promotion template is configured to control content of the promotion, the content comprising images and text, terms and conditions of the promotion, a price of the promotion, and one or more parameters of the promotion, the one or more parameters comprising cost to the consumer, value of the product or service offered, and fee charged to the merchant;
   presenting the merchant with the promotion template associated with the promotion type, wherein the promotion template defines at least one promotion parameter for the promotion,
   wherein the promotion template comprises a plurality of sliders that are dependent upon one another, wherein as a price parameter is adjusted by the merchant, one or more other parameters move in concert, wherein when a slider is adjusted to indicate increased volume of promotions to be offered, a slider associated with a fee per promotion sold is decreased, and wherein when a slider is adjusted to indicate an increase in the purchase price of the promotion by the merchant, an estimate of a number promotions that will be sold decreases, an expected revenue decreases, and a slider associated with the fee charged per promotion increases;
   generating the promotion in real-time; and
   publishing the promotion, in real-time, via a promotion and marketing service.

2. The method of claim 1, further comprising providing the promotion to the merchant for approval and wherein the promotion is published in response to receiving approval from the merchant.

3. The method of claim 1, further comprising determining a set of terms and conditions for the promotion, and wherein the promotion is generated with the determined set of terms and conditions.

4. The method of claim 3, wherein the set of terms and conditions is selected from a list of a plurality of sets of terms and conditions by the merchant.

5. The method of claim 1, further comprising receiving a modification of the at least one promotion parameter defined by the promotion template via the interface.

6. The method of claim 1, further comprising determining at least one price term for the promotion.

7. The method of claim 6, wherein the at least one price term is determined based on a set of historical promotion performance data.

8. The method of claim 6, wherein the at least one price term establishes a minimum return-on-investment for the merchant.

9. The method of claim 1, wherein the promotion template is selected by the merchant from a plurality of promotion templates.

10. The method of claim 9, wherein each of the plurality of promotion templates defines a different set of promotion content.

11. The method of claim 1, further comprising:
    receiving merchant identification information;
    verifying that a user interacting with the interface is a representative of a particular merchant using the merchant identification information; and
    generating the promotion only in response to verifying that the user is an authorized representative of the merchant.

12. The method of claim 1, further comprising:
    receiving transaction data from a point-of-sale system related to one or more transactions conducted by the merchant; and
    wherein indication of the promotion type is determined using at least the transaction data.

13. The method of claim 1, further comprising:
    receiving a list of products and/or services for sale by the merchant;
    generating inventory information based on the list of products, wherein the inventory information is configured to facilitate point-of-sale functionality at the merchant; and
    using the inventory information to provide at least one suggested promotion parameter to the merchant for use in the promotion.

14. The method of claim 1, further comprising:
    presenting the promotion for approval; and
    only publishing the promotion upon receiving confirmation of the approval of the promotion.

15. The method of claim 14, wherein the promotion is presented for approval to an automated approval system, and wherein the automated approval system determines whether the promotion is approved by a method comprising:
    determining that the at least one promotion parameter falls within an approved range of values defined for the at least one promotion parameter; and
    in response to determining that the at least one promotion parameter falls within the approved range of values for the at least one promotion parameter, approving the promotion for publication.

16. An apparatus for providing a merchant self-service interface, the apparatus comprising at least one processor coupled to a memory, the memory comprising computer executable instructions that, when executed by the processor, configure the apparatus to:
    identify a merchant;
    provide an interface to the merchant, the interface providing an interface control that allows the merchant to generate a promotion;
    receive an indication via the interface of a promotion type, wherein the promotion type defines at least one of a product or a service provided by the merchant;
    determine a merchant location, historical promotion sales for the merchant, and one or more merchant self-service indicators,
    wherein the self-service indicators comprise at least a merchant category, a geographic area, and customer purchase histories;

select a promotion template based on the promotion type, merchant location, historical promotion sales for the merchant, and the one or more merchant self-service indicators, wherein the promotion template is configured to control content of the promotion, the content comprising images and text, terms and conditions of the promotion, a price of the promotion, and one or more parameters of the promotion, the one or more parameters comprising cost to the consumer, value of the product or service offered, and fee charged to the merchant;

present the merchant with the promotion template associated with the promotion type, wherein the promotion template defines at least one promotion parameter for the promotion, wherein the promotion template comprises a plurality of sliders that are dependent upon one another, wherein as a price parameter is adjusted by the merchant, one or more other parameters move in concert, wherein when a slider is adjusted to indicate increased volume of promotions to be offered, a slider associated with a fee per promotion sold is decreased, and wherein when a slider is adjusted to indicate an increase in the purchase price of the promotion by the merchant, an estimate of a number promotions that will be sold decreases, an expected revenue decreases, and a slider associated with the fee charged per promotion increases;

generate the promotion in real-time; and publish the promotion, in real-time, via a promotion and marketing service.

17. The apparatus of claim 16, further configured to provide the promotion to the merchant for approval and wherein the promotion is published in response to receiving approval from the merchant.

18. The apparatus of claim 16, further configured to determine a set of terms and conditions for the promotion, and wherein the promotion is generated with the determined set of terms and conditions.

19. The apparatus of claim 18, wherein the set of terms and conditions is selected from a list of a plurality of sets of terms and conditions by the merchant.

20. The apparatus of claim 16, further configured to receive a modification of the at least one promotion parameter defined by the promotion template via the interface.

21. The apparatus of claim 16, further configured to determine at least one price term for the promotion.

22. The apparatus of claim 21, wherein the at least one price term is determined based on a set of historical promotion performance data.

23. The apparatus of claim 21, wherein the at least one price term establishes a minimum return-on-investment for the merchant.

24. The apparatus of claim 16, wherein the promotion template is selected by the merchant from a plurality of promotion templates.

25. The apparatus of claim 24, wherein each of the plurality of promotion templates defines a different set of promotion content.

26. The apparatus of claim 16, further configured to:
receive merchant identification information;
verify that a user interacting with the interface is a representative of a particular merchant using the merchant identification information; and
generate the promotion only in response to verifying that the user is an authorized representative of the merchant.

27. The apparatus of claim 16, further configured to:
receive transaction data from a point-of-sale system related to one or more transactions conducted by the merchant; and
wherein indication of the promotion type is determined using at least the transaction data.

28. The apparatus of claim 16, further configured to:
receive a list of products and/or services for sale by the merchant;
generate inventory information based on the list of products, wherein the inventory information is configured to facilitate point-of-sale functionality at the merchant; and
use the inventory information to provide at least one suggested promotion parameter to the merchant for use in the promotion.

29. The apparatus of claim 16, further configured to:
present the promotion for approval; and
only publish the promotion upon receiving confirmation of the approval of the promotion.

30. The apparatus of claim 29, wherein the apparatus presents the promotion for approval to an automated approval system, and wherein the automated approval system is configured to:
determine that the at least one promotion parameter falls within an approved range of values defined for the at least one promotion parameter; and
in response to determining that the at least one promotion parameter falls within the approved range of values for the at least one promotion parameter, approve the promotion for publication.

31. A non-transitory computer readable storage medium comprising instructions that, when executed by a processor, configure the processor to:
identify a merchant;
provide an interface to the merchant, the interface providing an interface control that allows the merchant to generate a promotion;
receive an indication via the interface of a promotion type, wherein the promotion type defines at least one of a product or a service provided by the merchant;
determine a merchant location, historical promotion sales for the merchant, and one or more merchant self-service indicators,
wherein the self-service indicators comprise at least a merchant category, a geographic area, and customer purchase histories;
select a promotion template based on the promotion type, merchant location, historical promotion sales for the merchant, and the one or more merchant self-service indicators,
wherein the promotion template is configured to control content of the promotion, the content comprising images and text, terms and conditions of the promotion, a price of the promotion, and one or more parameters of the promotion, the one or more parameters comprising cost to the consumer, value of the product or service offered, and fee charged to the merchant;
present the merchant with the promotion template associated with the promotion type, wherein the promotion template defines at least one promotion parameter for the promotion,
wherein the promotion template comprises a plurality of sliders that are dependent upon one another, wherein as a price parameter is adjusted by the merchant, one or more other parameters move in concert, wherein when a slider is adjusted to indicate increased volume of promotions to be offered, a slider associated with a fee per promotion sold is decreased, and wherein when a slider is adjusted to indicate an increase in the purchase price of the promotion by the merchant, an estimate of a number promotions that will be sold decreases, an expected revenue decreases, and a slider associated with the fee charged per promotion increases;

generate the promotion in real-time, and publish the promotion, in real-time, via a promotion and marketing service.

32. The computer readable storage medium of claim 31, further comprising instructions that configure the processor to provide the promotion to the merchant for approval and wherein the promotion is published in response to receiving approval from the merchant.

33. The computer readable storage medium of claim 31, further comprising instructions that configure the processor to determine a set of terms and conditions for the promotion, and wherein the promotion is generated with the determined set of terms and conditions.

34. The computer readable storage medium of claim 33, wherein the set of terms and conditions is selected from a list of a plurality of sets of terms and conditions by the merchant.

35. The computer readable storage medium of claim 31, further comprising instructions that configure the processor to receive a modification of the at least one promotion parameter defined by the promotion template via the interface.

36. The computer readable storage medium of claim 31, further comprising instructions that configure the processor to determine at least one price term for the promotion.

37. The computer readable storage medium of claim 36, wherein the at least one price term is determined based on a set of historical promotion performance data.

38. The computer readable storage medium of claim 31, wherein the at least one price term establishes a minimum return-on-investment for the merchant.

39. The computer readable storage medium of claim 31, wherein the promotion template is selected by the merchant from a plurality of promotion templates.

40. The computer readable storage medium of claim 39, wherein each of the plurality of promotion templates defines a different set of promotion content.

41. The computer readable storage medium of claim 31, further comprising instructions that configure the processor to:

receive merchant identification information;

verify that a user interacting with the interface is a representative of a particular merchant using the merchant identification information; and generate the promotion only in response to verifying that the user is an authorized representative of the merchant.

42. The computer readable storage medium of claim 31, further comprising instructions that configure the processor to:

receive transaction data from a point-of-sale system related to one or more transactions conducted by the merchant; and wherein indication of the promotion type is determined using at least the transaction data.

43. The computer readable storage medium of claim 31, further comprising instructions that configure the processor to:

receive a list of products and/or services for sale by the merchant;

generate inventory information based on the list of products, wherein the inventory information is configured to facilitate point-of-sale functionality at the merchant; and use the inventory information to provide at least one suggested promotion parameter to the merchant for use in the promotion.

44. The computer readable storage medium of claim 31, further comprising instructions that configure the processor to:

present the promotion for approval; and only publish the promotion upon receiving confirmation of the approval of the promotion.

45. The computer readable storage medium of claim 44, wherein the processor is configured to present the promotion for approval to an automated approval system, and wherein the automated approval system is configured to:

determine that the at least one promotion parameter falls within an approved range of values defined for the at least one promotion parameter; and in response to determining that the at least one promotion parameter falls within the approved range of values for the at least one promotion parameter, approve the promotion for publication.

* * * * *